US011555716B1

(12) United States Patent
Rigoni et al.

(10) Patent No.: US 11,555,716 B1
(45) Date of Patent: Jan. 17, 2023

(54) HARMONIC COMPENSATION WITH MAGNITUDE FEEDBACK FOR MAGNETIC FIELD SENSORS

(71) Applicant: Allegro MicroSystems, LLC, Manchester, NH (US)

(72) Inventors: Nicolás Rigoni, Manchester, NH (US); Cristian Trinidad, Buenos Aires (AR); Emanuele Andrea Casu, Annecy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 17/505,707

(22) Filed: Oct. 20, 2021

(51) Int. Cl.
*G01D 5/24* (2006.01)
*G01D 5/244* (2006.01)

(52) U.S. Cl.
CPC .............................. *G01D 5/24476* (2013.01)

(58) Field of Classification Search
CPC .................................................. G01D 5/24476
See application file for complete search history.

(56) References Cited

U.S. PATENT DOCUMENTS

| 9,389,060 | B2 | 7/2016 | Romero et al. |
| 10,120,042 | B2 | 11/2018 | Diaconu et al. |
| 10,585,147 | B2 | 3/2020 | Romero |
| 11,162,815 | B2 | 11/2021 | Sirohiwala et al. |
| 11,175,160 | B2 | 11/2021 | Aguirre et al. |
| 2012/0201337 | A1* | 8/2012 | Itkin ........................ H03F 3/24 375/359 |
| 2015/0176963 | A1* | 6/2015 | Diaconu .............. G01R 33/077 702/95 |
| 2020/0251965 | A1* | 8/2020 | Malvasi ................. H02K 29/08 |
| 2021/0190611 | A1* | 6/2021 | Liang ...................... G01L 5/221 |
| 2021/0270343 | A1* | 9/2021 | Battlogg ................. F16F 9/145 |
| 2021/0297020 | A1* | 9/2021 | Yamamoto ................ H02P 6/18 |

OTHER PUBLICATIONS

U.S. Appl. No. 17/082,151,filed Oct. 28, 2020, Drouin.
U.S. Appl. No. 17/120,395, filed Dec. 14, 2020, Casu, et al..
U.S. Appl. No. 17/232,440, filed Apr. 16, 2021, Diaconu, et al..
U.S. Appl. No. 17/331,981, filed May 27, 2021, Deligiannis, et al..
Allegro MicroSystems, LLC Application Information "Applying Harmonic Compensation to the A1335 Output Signal using On-Chip EEPROM and Allegro Applications Software" 2016, 9 pages.
Allegro MicroSystems, LLC A1335 Datasheet "Precision Hall-Effect Angle Sensor IC with I²C, SPI, and SENT Interfaces", Aug. 26, 2019, 29 pages.

* cited by examiner

*Primary Examiner* — Alvaro E Fortich
*Assistant Examiner* — Zannatul Ferdous
(74) *Attorney, Agent, or Firm* — Daly, Crowley, Mofford & Durkee, LLP

(57) ABSTRACT

A magnetic field sensor configured to sense a parameter associated with a rotatable target that affects a magnetic field includes at least one magnetic field sensing element that is arranged to generate a signal that is indicative of the magnetic field, a magnitude calculator responsive to the signal and configured to generate a magnitude signal indicative of a magnitude of the magnetic field, and a harmonic compensator responsive to the magnitude signal and configured to generate an estimate of a harmonic error of the signal and apply the estimate of the harmonic error of the signal to the signal to generate a corrected signal.

19 Claims, 9 Drawing Sheets

HARMONIC COMPENSATION WITH MAGNITUDE FEEDBACK FOR MAGNETIC FIELD SENSORS

CROSS REFERENCE TO RELATED APPLICATIONS

Not Applicable.

STATEMENT REGARDING FEDERALLY SPONSORED RESEARCH

Not Applicable.

FIELD

This disclosure relates generally to magnetic field sensors and, more particularly, to magnetic field sensors having harmonic compensation with magnetic field magnitude feedback.

BACKGROUND

As is known, sensors are used to perform various functions in a variety of applications. Some sensors include one or more magnetic field sensing elements, such as a Hall effect element or a magnetoresistive element or a pickup coil, to sense a magnetic field associated with proximity or motion of a target object, such as a magnetic or a ferromagnetic object in the form of a gear or ring magnet, or to sense a current, as examples. The signal or signals generated by one or more magnetic field sensing elements can be processed by respective signal paths that can be referred to as channels in order to generate one or more sensor output signals indicative of a parameter associated with the target, such as an angular position, a speed of rotation, and/or a direction of rotation of the target as examples.

Sensor integrated circuits are widely used in automobile control systems and other safety-critical applications. There are a variety of specifications that set forth requirements related to permissible sensor quality levels, failure rates, and overall functional safety. Error reduction in sensors is thus an important feature.

Error in the detected target parameter can be attributable to various sources. For example, misalignment between the magnetic field sensing elements and target can result in offset and amplitude errors of the magnetic field signals and ultimately in the detected target position. In some sensors, error (e.g., error in a calculated angle signal) can be expressed in its harmonic terms after performing a Fourier transform. Compensation for harmonic errors (i.e., harmonic compensation) can be performed by generating coefficients (e.g., coefficients representing the phase and magnitude of each harmonic error term) that can be stored and selectively applied to the sensor output signal. For example, in a manufacturing setting, data from a single rotation of the target that is measured by a proximate angle sensor can be stored and used to generate the harmonic compensation coefficients by performing a Fast Fourier Transform (FFT) on the collected data. In this way, the error can be recreated internally by the sensor and used to compensate the sensor output signal (e.g., by applying the recreated harmonic error terms to the computed angle).

One type of position sensor is an inductive sensor and can include a primary or transmitting coil that generates a biasing magnetic field in response to an oscillation signal and one or more secondary, or receiving, or pickup coils electromagnetically coupled to the primary coil for generating one or more secondary signals. The coupling between the primary and secondary coils is a function of a target position and the secondary signal or signals can be processed to detect a position of the target. For example, the target can be a ferrous core around which the primary and secondary coils are wound. In general, target position information is amplitude modulated in the secondary signal or signals that can be demodulated synchronously with respect to the primary oscillation in order to extract target position information.

Some inductive sensors include receiving coils designed to generate sinusoidal signals that have a phase difference of ninety degrees with respect to each other so that one such signal contains amplitude modulated sine information and the other signal contains amplitude modulated cosine information. The angle of the target can be calculated as the arctangent of the cosine signal (e.g., Y signal) divided by the sine signal (e.g., X signal).

SUMMARY

Described herein is a harmonic compensation scheme that is based on feedback of the magnetic field magnitude and that is applied to one or more sensor channel signals. With this arrangement, harmonic error estimates are applied to the channel signals to reduce or remove dependence of the error compensation on magnetic field magnitude variations, thereby resulting in improved compensation of the harmonic error terms. Since calculating field magnitude from uncompensated channels would lead to magnitude error in environments in which the field magnitude varies and thus, to defective compensation, the described feedback scheme results in substantially error free calculated field magnitude and accurate compensation of the harmonic error terms. Use of the compensated channel signals to generate the sensor output signal (e.g., to calculate target angular position) improves the accuracy of the sensor output signal.

According to the disclosure, a magnetic field sensor configured to sense a parameter associated with a rotatable target that affects a magnetic field includes at least one magnetic field sensing element arranged to generate a signal that is indicative of the magnetic field, a magnitude calculator responsive to the signal and configured to generate a magnitude signal indicative of a magnitude of the magnetic field, and a harmonic compensator. The harmonic compensator is responsive to the magnitude signal and configured to generate an estimate of a harmonic error of the signal and apply the estimate to the signal to generate a corrected signal.

Features may include one or more of the following individually or in combination with other features. The estimate of the harmonic error of the signal can include a plurality of coefficients, each corresponding to a phase angle of the rotatable target and a magnitude of the magnetic field. The rotatable target can have a plurality of magnetic poles and the harmonic error can be based at least in part on one or more of variations in the signal attributable to the plurality of magnetic poles, mounting of the magnetic field sensor with respect to the rotatable target, and manufacturing tolerances associated with the rotatable target and/or the at least one magnetic field sensing element. The parameter associated with the rotatable target can be one or more of an angular position, a speed of rotation, and/or a direction of rotation. The at least one magnetic field sensing element can include at least one first magnetic field sensing element arranged to generate a first signal that is indicative of the parameter associated with the target and at least one second magnetic field sensing element arranged to generate a second signal that is indicative of the parameter associated with the target, wherein the parameter associated with the rotatable target is an angular position of the rotatable target, and wherein the harmonic compensator is configured to generate an estimate of a harmonic error of the first signal and the second signal and apply the estimate of the harmonic error of the first signal to the first signal to generate a first corrected signal and apply the estimate of the harmonic error of the second signal to the second signal to generate a second corrected signal. In some embodiments, the first and second signals can be in quadrature. The magnetic field sensor can further include an angle calculator configured to generate an angle signal indicative of the angular position of the rotatable target based on the first signal and the second signal, wherein the harmonic compensator is further responsive to the angle signal and configured to generate the estimate of a harmonic error of the first signal and the second signal. In some embodiments, the magnitude calculator and the angle calculator can include a CORDIC processor. In some embodiments, the rotatable target includes a primary coil coupled to receive an oscillation signal, wherein the at least one first magnetic field sensing element includes a first secondary coil electromagnetically coupled to the primary coil and configured to generate the first signal, and the at least one second magnetic field sensing element includes a secondary coil electromagnetically coupled to the primary coil and configured to generate the second signal. The magnetic field sensor can further include a first summation element coupled to receive the estimate of a harmonic error of the first signal and apply the estimate of a harmonic error of the first signal to the first signal and a second summation element coupled to receive the estimate of a harmonic error of the second signal and apply the estimate of a harmonic error of the second signal to the second signal.

Also described is a method for correcting a harmonic error of a magnetic field signal generated by a magnetic field sensing element in response a magnetic field affected by rotation of a target, including calculating a magnitude of the magnetic field, estimating the harmonic error of the magnetic field signal based on the magnitude of the magnetic field, and applying the estimate of the harmonic error of the magnetic field signal to the magnetic field signal to generate a corrected signal.

Features may include one or more of the following individually or in combination with other features. Estimating the harmonic error of the signal can include generating a plurality of coefficients, each corresponding to a phase angle of the rotatable target and a magnitude of the magnetic field. The method can further include calculating an angular position of the target and generating the estimate of the harmonic error of the magnetic field signal based on both the calculated angular position and the magnitude of the magnetic field. The method can further include calculating an angular position of the rotatable target. Estimating the harmonic error of the magnetic field signal can be further based on the angular position of the rotatable target. Calculating the magnitude of the magnetic field comprises using a CORDIC processor.

According to a further aspect of the disclosure, a magnetic field sensor configured to sense an angular position of a rotatable target that affects a magnetic field includes at least one first magnetic field sensing element that is arranged to generate a first signal that is indicative of the magnetic field, at least one second magnetic field sensing element that is arranged to generate a second signal that is indicative of the magnetic field, an angle calculator responsive to the first signal and to the second signal to generate an angle signal indicative of the angular position of the rotatable target, and a magnitude calculator responsive to the signal and configured to generate a magnitude signal indicative of a magnitude of the magnetic field. The magnetic field sensor further includes a harmonic compensator responsive to the angle signal and to the magnitude signal and configured to generate an estimate of a harmonic error of the first signal and apply the estimate of the harmonic error of the first signal to the first signal to generate a first corrected signal and generate an estimate of a harmonic error of the second signal and apply the estimate of the harmonic error of the second signal to the second signal to generate a second corrected signal.

Features may include one or more of the following individually or in combination with other features. The rotatable target can include a primary coil coupled to receive an oscillation signal, wherein the at least one first magnetic field sensing element comprises a first secondary coil electromagnetically coupled to the primary coil and configured to generate the first signal, and wherein the at least one second magnetic field sensing element comprises a secondary coil electromagnetically coupled to the primary coil and configured to generate the second signal. The estimate of the harmonic error of the first signal and the estimate of the harmonic error of the second signal can each include a plurality of coefficients corresponding to a phase angle of the rotatable target and a magnitude of the magnetic field. The rotatable target can have a plurality of magnetic poles and the harmonic error of the first signal and the second signal can be based at least in part on one or more of variations in the first signal or the second signal attributable to the plurality of magnetic poles, mounting of the magnetic field sensor with respect to the rotatable target, and manufacturing tolerances associated with the rotatable target, the at least one first magnetic field sensing element, and/or the at least one second magnetic field sensing element.

BRIEF DESCRIPTION OF THE DRAWINGS

The foregoing features of the disclosure, as well as the disclosure itself may be more fully understood from the following detailed description of the drawings, in which like reference numerals identify similar or identical elements.

DETAILED DESCRIPTION

Before describing the present disclosure, some introductory concepts and terminology are explained.

As used herein, the term "processor" or "controller" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Figure 1:
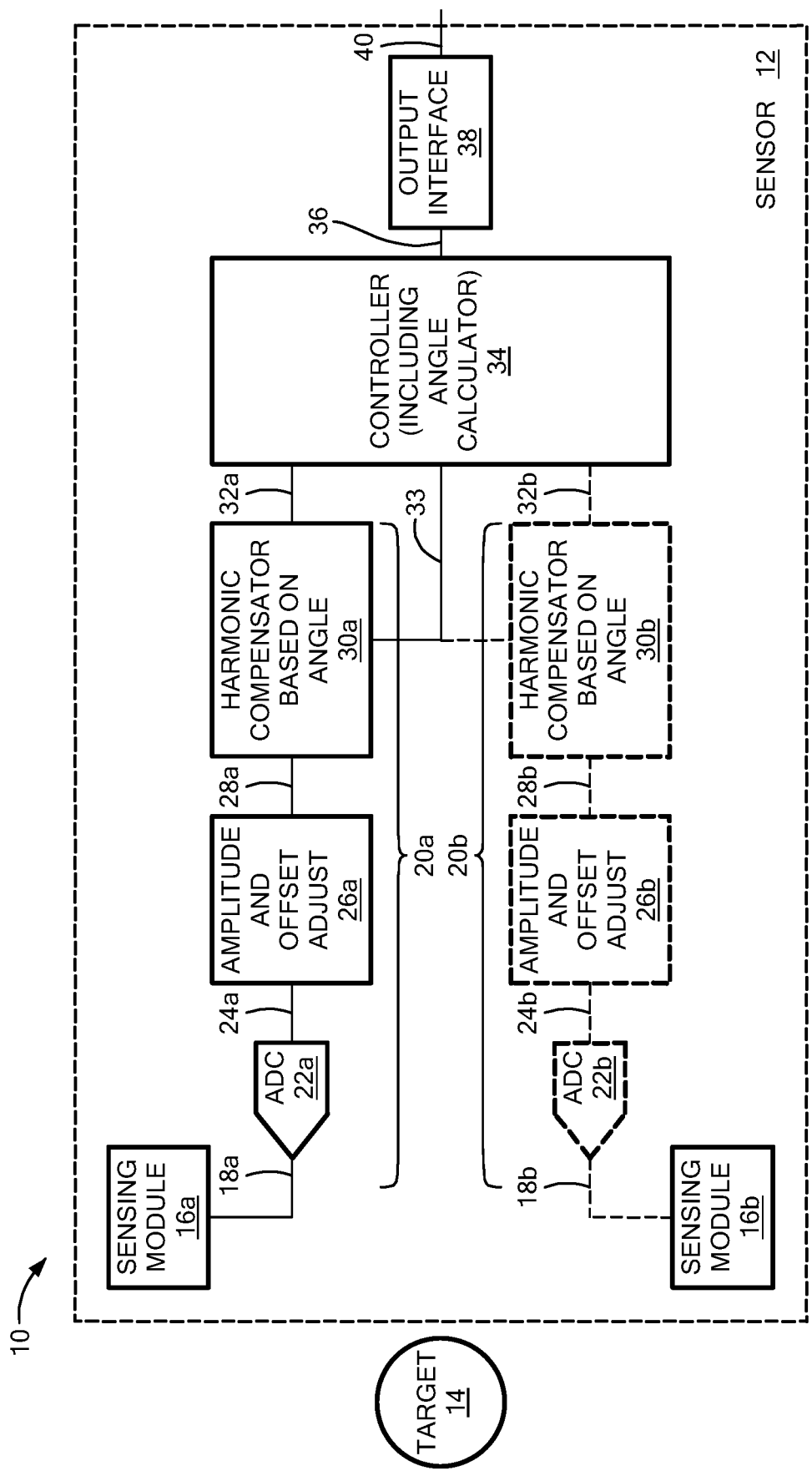
FIG. 1 is a block diagram of a magnetic field sensor including harmonic compensation according to the disclosure.

Referring to FIG. 1, a magnetic field sensor system 10 includes a sensor 12 configured to sense a parameter associated with a rotatable target 14 that affects a magnetic field. Sensor 12 includes at least one magnetic field sensing element (e.g., sensing module 18a) that is arranged to generate a signal that is indicative of the magnetic field. The sensor 12 may take various forms, such as an angle sensor configured to detect a magnetic field that is associated with the rotatable target 14 and generate an output signal 40 that is at least in part indicative of the angular position of the target 14. More generally however, sensor 12 can take the form of other types of sensors. Thus, the output signal 40 may indicate one or more of an angular position of the rotating target 14, speed of rotation of the rotating target 14, direction of rotation of the rotating target 14, acceleration of the rotating target 14, and/or any other parameter or characteristic of movement of the rotating target 14.

The rotating target 14 may include one more of a permanent magnet (e.g., a 2-pole magnet or a multi-pole magnet), a gear, a metal object, a rotor of an electric motor, and/or any other suitable type of target. The magnetic field that is associated with the rotating target 14 may include a magnetic field that is generated by the rotating target 14, a magnetic field that is generated by a back bias magnet and modulated by the rotating target 14, a magnetic field that is induced in the rotating target 14 by another magnetic field source, a magnetic field that is generated in a coil that rotates with the target 14, and/or any other suitable type of magnetic field.

Sensor 12 may include a first sensing module 16a, a first signal path or channel 20a, a second sensing module 16b, and a second signal path or channel 20b. Sensor 12 may further include a controller 34 and an output interface 38.

The sensing module 16a may include one or more magnetic field sensing elements. Each of the magnetic field sensing elements may include one or more of a giant magnetoresistor (GMR), a tunnel magnetoresistor (TMR), a Hall effect element, a pickup coil, and/or any other suitable type of magnetic field sensing element. Each of the magnetic field sensing elements in the sensing module 16a may have a first axis of maximum sensitivity. The sensing module 16b may include one or more magnetic field sensing elements. Each of the magnetic field sensing elements may include one or more of a giant magnetoresistor (GMR), a tunnel magnetoresistor (TMR), a Hall effect element, a pickup coil, and/or any other suitable type of magnetic field sensing element. Each of the magnetic field sensing elements in the sensing module 16b may have a second axis of maximum sensitivity that is perpendicular to the first axis of maximum sensitivity. As a result of this arrangement, a signal generated, at least in part, by one of sensing modules 16a-16b may have a sinusoidal waveform, and a signal generated, at least in part, by the other one of sensing modules 16a-16b may have a cosinusiodal waveform, rendering the resulting signals 18a, 18b responsive to orthogonal field components (i.e., in quadrature).

In an example embodiment, sensor 12 can be an inductive rotary sensor in which case sensing modules 16a, 16b can take the form of secondary, or pickup coils and the sensor can include a primary coil coupled to receive an oscillation signal. The primary coil can be coupled to the rotatable target 14 so that the angular position of the target can be sensed by the secondary coils that are electromagnetically coupled to the primary coil. In other words, the electromagnetic coupling between the primary and secondary coils is a function of the target position. In an example embodiment, the target 14 is a metallic, non-ferromagnetic object and the primary coil induces eddy currents in the target, which eddy currents, in turn induce a signal in the secondary coils 16a, 16b. As the target 14 moves (e.g., rotates), the coupling between the primary winding and the secondary windings 16a, 16b changes, so as to thereby encode target position information by way of amplitude modulation of the secondary signals 18a, 18b. It will be appreciated that various mechanical configurations for the target 14 and pickup coils 16a, 16b are possible.

The signal paths 20a, 20b can be coupled to receive the signals 18a, 18b generated by the respective sensing modules 16a, 16b and may include various signal conditioning and compensation of possible errors due to sensor-target alignments and design tolerances for example. The signal path 20a may include an analog-to-digital converter (ADC) 22a configured to convert signal 18a into a digital signal 24a and an amplitude and offset adjustment block 26a. The signal path 20b may include an ADC 22b configured to convert signal 18b into a digital signal 24b and an amplitude and offset adjustment block 26b.

The amplitude and offset adjustment blocks 26a, 26b can adjust signal amplitude (i.e., gain) and offset based on temperature variations and other factors to generate respective signals 28a, 28b. To this end, sensor 12 can include a temperature sensor (not shown). Adjusting the gain of the signals 24a, 24b may include multiplying the respective signal by a gain adjustment coefficient as may be stored in memory and offsetting the signals 24a, 24b may including adding an offset adjustment coefficient as may be stored in memory to the respective signal. It will be understood that the present disclosure is not limited to any specific method for adjusting a magnetic field signal based on an offset adjustment coefficient and/or a gain adjustment coefficient.

Harmonic error compensation can be provided by harmonic compensators 30a, 30b that perform harmonic compensation on channel signals 28a, 28b using correction coefficients stored in memory (memory not shown separately in FIG. 1, but that can form part of compensators 30a, 30b for example) during manufacture in order to thereby remove undesirable harmonics that could adversely affect the sensor output signal 40, as explained below. In general, the correction coefficients can be considered to represent an estimate of the harmonic error to be removed from the channel signals.

It will be appreciated that a "channel" refers generally to processing circuitry associated with one or more magnetic field sensing elements and configured to generate a respective corrected signal 32a, 32b. As used herein, the term "channel signal" refers to any signal in a channel 20a, 20b that has not undergone harmonic compensation. Thus, in the context of channel 20a for example, signals 18a, 24a, and 28a can be considered channel signals, whereas signal 32a is a compensated, or corrected signal. Similarly, in the context of channel 20b, signals 18b, 24b, and 28b can be considered channel signals, whereas signal 32b is a compensated, or corrected signal. While the particular processing circuitry shown in FIG. 1 to provide a corrected signal 32a includes sensing module 16a, ADC 22a, amplitude and offset adjustment block 26a, and harmonic compensator 30a (and similarly the processing circuitry shown in FIG. 1 to provide corrected signal 32b includes sensing module 16b, ADC 22b, amplitude and offset adjustment block 26b, and harmonic compensator 30b), such channels can include less, more, different, or a different coupling of processing circuitry. Furthermore, while each illustrated channel 20a, 20b has a respective ADC 22a, 22b at the front end of the channel and thus, operates in the digital domain, other configurations are possible.

Controller 34 may include any suitable type of processing circuitry, such as an application-specific integrated circuit (ASIC), a special-purpose processor, synchronous digital logic, asynchronous digital logic, a general-purpose processor (e.g., a MIPS processor, an ×86 processor), etc. In the example sensor 12, controller 34 includes an angle calculator as may take the form of a CORDIC processor for example with which an angle of rotation of the target 14 can be computed based on the first and second corrected signals 32a, 32b, respectively. The resulting angle signal 33 can be fed back to compensators 30a, 30b and can be used to generate the sensor output signal 40.

Harmonic compensators 30a, 30b can be responsive to the feedback angle signal 33 to select stored compensation coefficients for application to the respective channel signal 28a, 28b. For example, compensators 30a, 30b can include respective summation elements for combining (e.g., by adding and/or subtracting) the selected harmonic compensation coefficients (i.e., the estimates of the harmonic error terms) with the channel signals 28a, 28b in order to generate respective harmonic error corrected signals 32a, 32b. Application of the harmonic error term estimates to the channel signals 28a, 28b advantageously provides for corrected signals 32a, 32b to be used by the controller 34 and output interface 38 in order to thereby improve the accuracy of the sensor output signal 40.

Each of the stored plurality of harmonic compensation coefficients corresponds to a phase angle of the rotatable target 14 and a magnitude of the magnetic field at the particular phase angle. The stored compensation coefficients can be determined during manufacture, for example by collecting sensor output data during a single rotation of the target 14 and performing a Fast Fourier Transform (FFT) on the collected data. Given that the harmonic compensation coefficients are determined when the sensor 12 is in a manufacturing environment (e.g., in proximity to the same or same type of rotating target 14 with which it will be put into use), the coefficients are based at least in part on one or more of variations in the signal attributable to the multiple magnetic poles of the target and manufacturing tolerances associated with the rotatable target and/or the at least one magnetic field sensing element. In this way, the harmonic error coefficients can be considered to be trimmed based on the manufacturing specifics of the sensor and target, such as the type and configuration of sensing modules 16a, 16b and can be stored in memory, such as a non-volatile memory, for use during sensor operation.

It will be appreciated by those of ordinary skill in the art that in applications in which the magnitude of the magnetic field varies with time due to factors specific to the application environment (e.g., sensor and/or target mounting tolerances that may affect airgap and/or other variations in use or over time), harmonic error coefficients selected based only on the feedback angle signal 33 may not compensate for such field magnitude variations. According to a further aspect of the disclosure discussed below in connection with FIG. 3, magnetic field magnitude variations can be taken into account when generating the harmonic error estimates that are applied to the channel signals and this arrangement can yield more accurate compensated channel signals and thus, ultimately more accurate sensor output signals.

The controller 34 may normalize corrected signals 32a and 32b and use the normalized signals to determine the angular position of the rotating target 14 in accordance with equation 1 below:

$$\theta = a\tan\left(\frac{S_{32b}}{S_{32a}}\right) \quad (1)$$

where θ is the angular position of the rotating target 14, $S_{32a}$ is the value of signal 32a, and $S_{32b}$ is the value of signal 32b. It will be appreciated by those of ordinary skill in the art that the computation of equation (1) can be performed by a CORDIC processor, or other suitable processing. After the angular position of the rotating target 14 is determined, the controller 34 may generate the output signal 40 based on the determined angular position.

The output interface 38 is responsive to the controller output signal 36 and may include any suitable type of interface for outputting the output signal 40. For example, the output interface 38 may include one or more of a current generator, an Inter-Integrated Circuit (I²C) interface, a Controller Area Network (CAN bus) interface, a Single Edge Nibble Transmission (SENT) interface, Wi-Fi interface, a local-area network interface, a 5G wireless interface, and/or any other suitable type of interface.

While the sensor 12 of FIG. 1 is described as taking the form of an angle sensor that generates a sensor output signal 40 indicative of the angular position of the target 14, it will be appreciated by those of ordinary skill in the art that sensor 12 can alternatively take other forms, such as a speed sensor, linear sensor, or current sensor as a few non-limiting examples. It will be further appreciated by those of ordinary skill in the art that while the sensor 12 is shown to include two channels 20a, 20b, more or fewer channels are possible. For example, channel 20b could be eliminated to yield a single channel sensor. In a single channel embodiment, it will be appreciated that a different mechanism for generating feedback angle signal 33 is required to make use of harmonic compensator 30a. By way of a non-limiting example, in the case of a single channel speed sensor, controller 34 can perform an angle computation based on detection of the target speed and the time between a plurality of threshold crossing switch points (e.g., points at which a channel signal 18a crosses a predetermined threshold) in order to determine target angular position. As another example, a third channel could be added and the sensing modules from the three channels (e.g., three secondary pickup coils of an inductive sensor) could be arranged to generate respective signals having a 120° phase shift with respect to each other from which the angle could be calculated.

Figure 2:
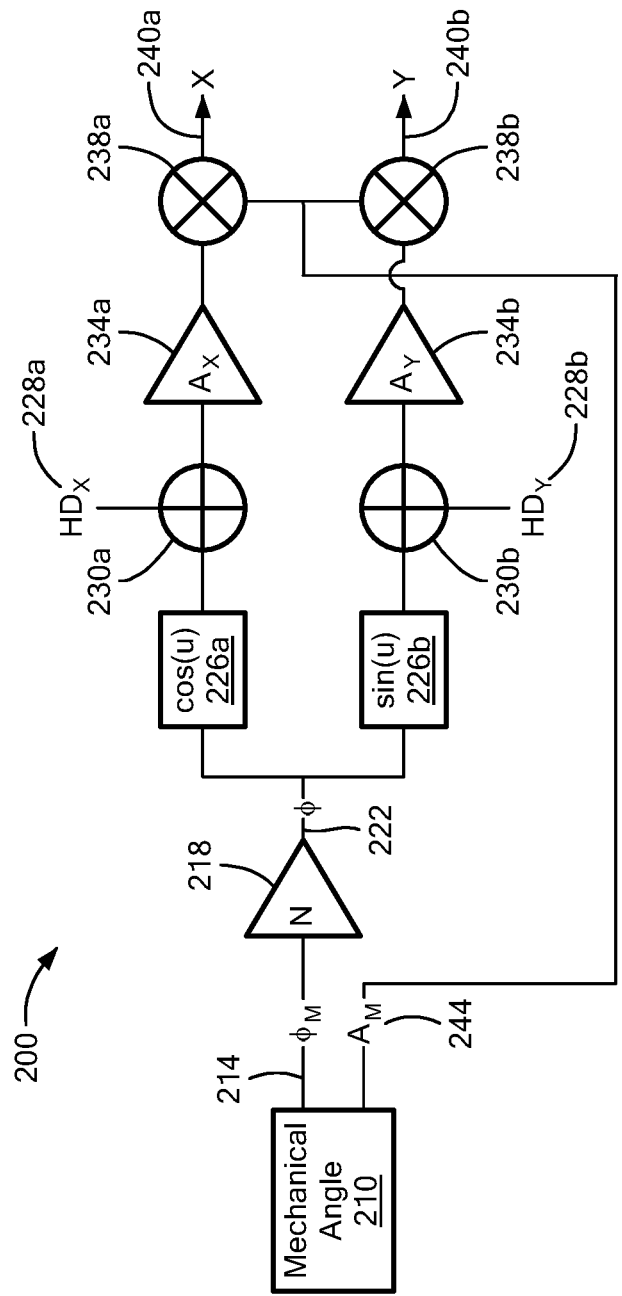
FIG. 2 shows a model of the magnetic field sensor of FIG. 1.

Referring also to FIG. 2, a system model 200 as may represent the target 14 and the sensing modules 16a, 16b of FIG. 1 illustrates error sources that can and cannot be removed by harmonic compensators 30a, 30b. Model 200 includes a block 210 representing the mechanical angle of the rotating target 14 (FIG. 1). For purposes of model 200, target 14 is a multi-pole target that generates multiple periods in the detected electrical signal. The electrical signal representation of the target angle is labeled $\phi_M$ 214. Thus, in a target 14 having N poles 218, the detected magnetic field signals (e.g., signals 18a, 18b of FIG. 1) have N periods, with a single period labeled $\phi_M$.

The sensing modules 16a, 16b (FIG. 1) that generate channel signals (e.g., signals 18a, 18b of FIG. 1) are in quadrature and thus, can be represented by cosine and sine blocks 226a, 226b, respectively. For example, in the case of an inductive rotary sensor 12, sensing modules 16a, 16b are pickup coils designed to generate respective signals in quadrature (i.e., having a nominal ninety-degree phase shift with respect to each other).

In the model 200, summation elements 230a, 230b represent injection of harmonic error to the respective channel signal. Harmonic error HDx 228a, HDy 228b can represent sensing element non-idealities and other error sources.

Each channel can experience sensitivity variation (i.e., signal amplitude variation) for a given field based on magnetic field generator characteristics, such as transmitting coil characteristics in an inductive rotary sensor. Such sensitivity variation can be represented by gain elements $A_X$ 234a, $A_Y$ 234b. While these gain terms $A_X$ 234a, $A_Y$ 234b should remain constant, in use, mounting tolerances for example can result in a mismatch.

In some sensors and sensor applications, the channel signals can experience amplitude modulation as a function of the target mechanical angle. For example, in inductive rotary sensors, such amplitude modulation can result from mounting tolerances, such as a variation in the airgap between receiving coils 16a, 16b and the target 14 and/or a variation in the magnitude of the magnetic field experienced by receiving coils 16a, 16b based on target rotation angle. Such amplitude modulation is represented by signal $A_M$ 244 that is a function of the mechanical angle and that can be applied to the channel signals by summation elements 238a, 238b to generate signals 240a, 240b.

Although the amplitude modulation term $A_M$ 244 should be constant once the sensor 12 is mounted in the application, mounting tolerances and other non-idealities can result in amplitude modulation that varies with target angle. Given that such amplitude modulation $A_M$ 244 can affect the harmonic error, the harmonic compensators 30a, 30b of FIG. 1 will not compensate for this error term and thus, the corrected signals 32a, 32b (and modeled corrected signals 240a, 240b) and the resulting target angle signal 40 (FIG. 1) may not be completely error-free.

Figure 3:
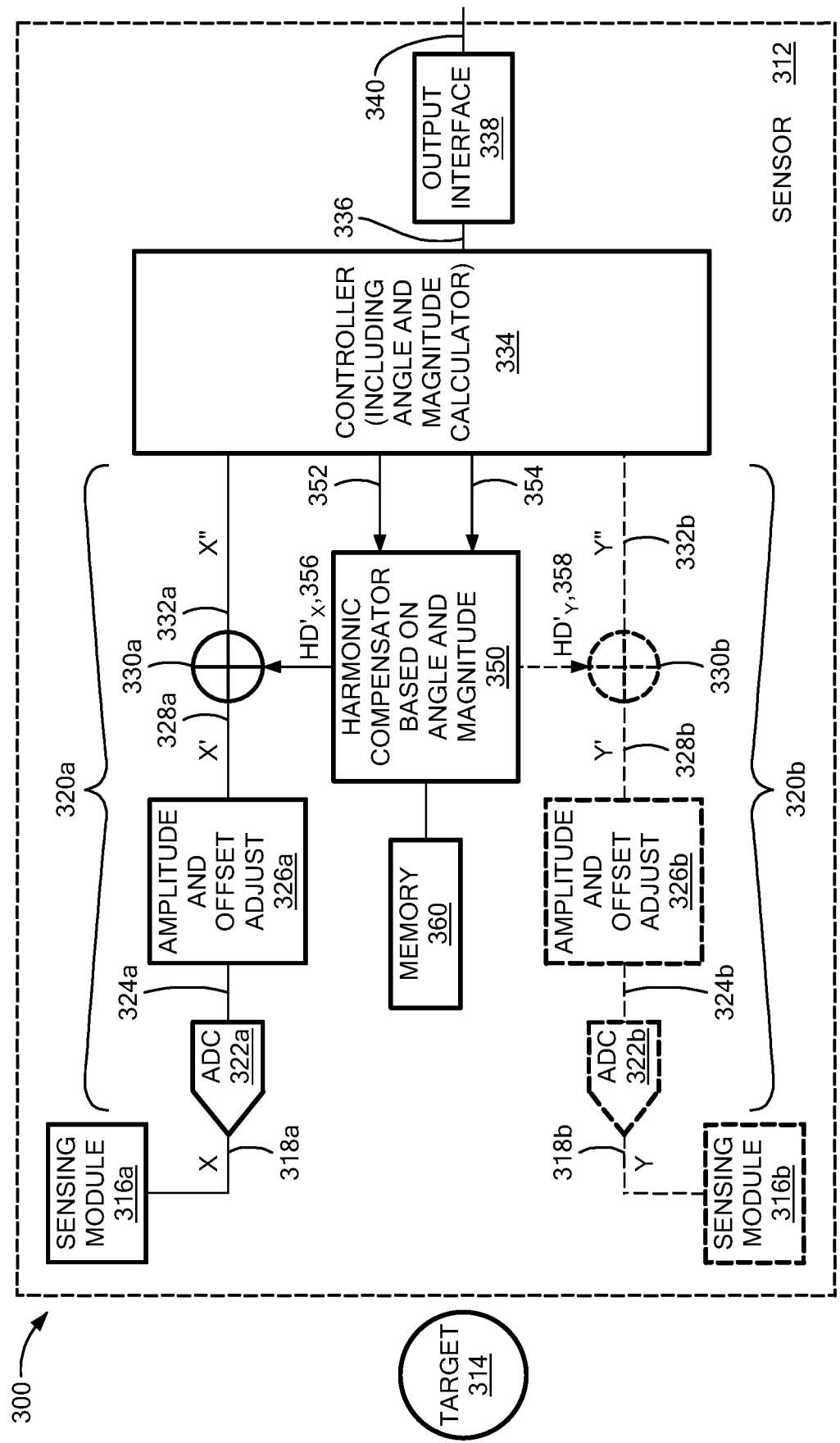
FIG. 3 is a block diagram of a magnetic field sensor including harmonic compensation with field magnitude feedback according to the disclosure.

Referring also to FIG. 3, a sensor system 300 includes a sensor 312 for sensing a parameter associated with a rotatable target 314 that affects a magnetic field according to the disclosure. As will be explained, sensor 312 corrects for the same type of harmonic errors compensated for by compensators 30a, 30b (FIG. 1) and additionally corrects for errors described in connection with the model 200 of FIG. 2 as resulting in amplitude modulation $A_M$ 244 on the channel signals. To this end, sensor 312 includes a controller 334 implementing a magnitude calculator as will be explained.

Sensor 312 includes at least one magnetic field sensing element, here shown as a sensing module 18a, that is arranged to generate a signal that is indicative of the magnetic field. The sensor 312 may take various forms, such as an angle sensor to detect a magnetic field associated with the rotatable target 14 and generate an output signal 340 that is at least in part indicative of the angular position of the target 314. More generally however, sensor 312 can take the form of other types of sensors. Thus, the output signal 340 may indicate one or more of a angular position of the rotating target 314, speed of rotation of the rotating target 314, direction of rotation of the rotating target 314, acceleration of the rotating target 314, and/or any other parameter or characteristic of movement of the rotating target 314.

The rotating target 314 can be the same as or similar to rotating target 14 of FIG. 1. Thus, target 314 may include one more of a permanent magnet (e.g., a 2-pole magnet or a multi-pole magnet), a gear, a metal object, a rotor of an electric motor, and/or any other suitable type of target. The magnetic field that is associated with the rotating target 314 may include a magnetic field that is generated by the rotating target 314, a magnetic field that is generated by a back bias magnet and modulated by the rotating target 314, a magnetic field that is induced in the rotating target 314 by another magnetic field source, a magnetic field that is generated in a coil that rotates with the target 314, and/or any other suitable type of magnetic field.

Sensor 312 may include a first sensing module 316a, a first signal path or channel 320a, a second sensing module 316b, and a second signal path or channel 320b. Sensor 312 may further include a controller 334 and an output interface 338.

Sensing modules 316a, 316b may be the same as or similar to sensing modules 16a, 16b of FIG. 1. In an example embodiment sensing modules 316a, 316b have respective axes of maximum sensitivity that are orthogonal to each other, such that the channels 320a, 320b are in quadrature with the channel signal 318a having a sinusoidal waveform and the channel signal 318b having a cosinusoidal waveform.

In an example embodiment, sensor 312 can be an inductive rotary sensor in which case sensing modules 316a, 316b can take the form of secondary, or pickup coils and the sensor can include a primary coil coupled to receive an oscillation signal. The primary coil can be coupled to the rotatable target 314 so that angular position of the target can be sensed by the secondary coils that are electromagnetically coupled to the primary coil. In other words, the electromagnetic coupling between the primary and secondary coils is a function of the target position. In an example embodiment, the target 314 is a metallic, non-ferromagnetic object and the primary coil induces eddy currents in the target, which eddy currents, in turn induce a signal in the secondary coils 316a, 316b. As the target 314 moves (e.g., rotates), the coupling between the primary winding and the secondary windings 316a, 316b changes, so as to thereby encode target position information by way of amplitude modulation of the secondary signals 318a, 318b. It will be appreciated that various mechanical configurations for the target 314 and pickup coils 316a, 316b are possible.

The signal paths 320a, 320b can be coupled to receive the signals 318a, 318b generated by the respective sensing modules 316a, 316b and may include various signal conditioning and compensation of possible errors due to sensor-target alignments and system design tolerances for example. The signal path 320a may include an analog-to-digital converter (ADC) 322a configured to convert signal 318a into a digital signal 324a and an amplitude and offset adjustment block 326a. The signal path 320b may include an ADC 322b configured to convert signal 318b into a digital signal 324b and an amplitude and offset adjustment block 326b.

The amplitude and offset adjustment blocks 326a, 326b can adjust signal amplitude (i.e., gain) and offset based on temperature variations and other factors to generate respective signals 328a, 328b. To this end, sensor 312 can include a temperature sensor (not shown). Adjusting the gain of the signals 324a, 324b may include multiplying the respective signal by a gain adjustment coefficient as may be stored in memory and offsetting the signals 324a, 324b may including adding an offset adjustment coefficient as may be stored in memory to the respective signal. The amplitude and offset adjustment blocks 326a, 326b can normalize the channel signals 324a, 324b, such as by using a multiplicative inverse computation or by adjusting the amplitude of both channel signals to the same known amplitude value. It will be understood that the present disclosure is not limited to any specific method for adjusting a magnetic field signal based on an offset adjustment coefficient and/or a gain adjustment coefficient.

Harmonic error compensation can be performed on channel signals 328a, 328b by harmonic compensator 350. More particularly, a summation element 330a can be coupled to apply (i.e., add and/or subtract) estimated harmonic error terms HD'x 356 to channel signal 328a in order to thereby generate a corrected signal 332a and, similarly, a summation element 330b can be coupled to apply (i.e., add and/or subtract) estimated harmonic error terms HD'y 358 to channel signal 328b in order to thereby generate a corrected signal 332b.

Estimated harmonic error terms HD'x 356, HD'y 358 are based in part on correction coefficients stored in memory 360 and also on feedback signals 352, 354. Feedback signal 352 can be an angle feedback signal indicative of a measured angle of the target 314 and feedback signal 354 can be a magnitude feedback signal indicative of a measured magnitude of the magnetic field as will be explained. The stored correction coefficients can be the same as or similar to the correction coefficients described above in connection with FIG. 1 and thus, can be generated during manufacture and represent an estimate of the harmonic error to be removed from the channel signals. Memory 360 may include any suitable type of volatile and/or non-volatile memory. By way of example, the memory 360 may include a random-access memory (RAM), a dynamic random-access memory (DRAM), an electrically-erasable programmable read-only memory (EEPROM), and/or any other suitable type of memory.

It will be appreciated that a "channel" refers generally to processing circuitry associated with one or more magnetic field sensing elements and configured to generate a respective corrected signal 332a, 332b. As used herein, the term "channel signal" refers to any signal in a channel 320a, 320b that has not undergone harmonic compensation. Thus, in the context of channel 320a for example, signals 318a, 324a, and 328a can be considered channel signals, whereas signal 332a is a compensated, or corrected signal. Similarly, in the context of channel 320b, signals 318b, 324b, and 328b can be considered channel signals, whereas signal 332b is a compensated, or corrected signal. While the particular processing circuitry shown in FIG. 3 to provide a corrected signal 332a includes sensing module 316a, ADC 322a, amplitude and offset adjustment block 326a, and summation element 330a (and similarly the processing circuitry shown in FIG. 3 to provide channel signal 332b includes sensing module 316b, ADC 322b, amplitude and offset adjustment block 326b, and summation element 330b), such channels can include less, more, or different processing circuitry. Furthermore, while each illustrated channel 320a, 320b has a respective ADC 322a, 322b at the front end of the channel and thus, operates on the channel signal in the digital domain, other configurations are possible.

Controller 334 may include any suitable type of processing circuitry, such as an application-specific integrated circuit (ASIC), a special-purpose processor, synchronous digital logic, asynchronous digital logic, a general-purpose processor (e.g., a MIPS processor, an x86 processor), etc. In the example sensor 312, controller 334 includes an angle calculator as may take the form of a CORDIC processor for example with which an angle of rotation of the target 314 can be computed based on the first and second corrected signals 332a, 332b, respectively, in order to generate an angle signal 352 that is fed back to the compensator 350.

According to the disclosure, controller 334 can further include a magnetic field magnitude calculator with which a signal 354 is generated that is indicative of a magnitude of the magnetic field affected by rotating target 314. Field magnitude signal 354 is fed back to compensator 350 for use in selecting harmonic error coefficients to be applied to the channel signal, as will be explained. Controller 334 can compute the magnetic field magnitude using a CORDIC, or other type processor as the square root of $x^2+y^2$, where x is the value of signal 332a and y is the value of signal 332b.

Alternatively or additionally to the above-noted field magnitude computation, in some embodiments, the controller 334 can include an angle tracking observer (i.e., the angle calculator can take the form of an angle tracking observer) with which the angle of rotation of the target 314 can be determined and a magnitude calculator that leverages one or more of the angle tracking observer processing blocks. For example, the angle tracking observer can be configured to iteratively reduce an error given by error=y*cos($\varphi$*+$\beta$)−x*sin($\varphi$*) where x is the value of signal 332a, y is the value of signal 332b, $\varphi$* is the computed angular position of the target 314, and $\beta$* is a non-orthogonality error term and the magnitude calculator can re-use a sine block and a cosine block of the angle tracking observer to compute the magnetic field magnitude as follows: A*=x*cos($\varphi$*)+y*sin ($\varphi$*+$\beta$*). The non-orthogonality error term $\beta$* can be generated during manufacture and/or during operational use of the sensor by measuring the non-orthogonality error in the computed angle and programming the measured error into memory for use during operation of the sensor and, in some embodiments, the non-orthogonality error term $\beta$* can be dynamically determined (i.e., estimated) during operation of the sensor.

Harmonic compensator 350 can be responsive to the feedback angle signal 352 and to the feedback field magnitude signal 354 to select stored compensation coefficients for application to the respective channel signal 328a, 328b. It will be appreciated by those of ordinary skill in the art that while the compensator 350 of FIG. 3 is shown as a common element that is shared by channels 320a, 320b and thus that provides the selected harmonic error estimates to summation elements 330a, 330b, the topology of sensor 312 could alternatively be such that the compensator is shown as two separate compensators, with one in series with each processing channel 320a, 320b (as in the manner of series-coupled compensators 30a, 30b of FIG. 1).

Application of the harmonic error terms to the channel signals 328a, 328b advantageously provides for corrected signals 332a, 332b to be used by the controller 334 and output interface 338 in order to thereby improve the accuracy of the sensor output signal 340. Furthermore, by basing the angle and magnitude feedback signals 352, 354 on the corrected signals 332a, 332b, the resulting harmonic error estimates HD'x 356, HD'y 358 are more accurate and thus, error is more accurately compensated.

Each of the stored plurality of harmonic compensation coefficients corresponds to a phase angle of the rotatable target 314 and a magnitude of the magnetic field at the particular phase angle. The stored compensation coefficients can be determined during manufacture, for example by collecting sensor output data during a single rotation of the target 314 and performing a Fast Fourier Transform (FFT) on the collected data. Given that the harmonic compensation coefficients are determined when the sensor 312 is in a manufacturing environment (e.g., in proximity to the same or same type of rotating target 314 with which it will be put into use), the coefficients are based at least in part on one or more of variations in the signal attributable to the multiple magnetic poles of the target and manufacturing tolerances associated with the rotatable target and/or the at least one magnetic field sensing element. In this way, the harmonic error coefficients can be considered to be trimmed based on the manufacturing specifics of the sensor and target, such as the type and configuration of sensing modules 16a, 16b and can be stored in memory, such as a non-volatile memory, for use during sensor operation.

By additionally basing the selected harmonic error coefficients on the calculated field magnitude (e.g., on feedback signal 354), additional error sources that cause magnetic field magnitude variation over time (and that result in amplitude modulation $A_M$ 244 on the channel signals as explained above in connection with FIG. 2) can be compensated. In this way, the harmonic error coefficients can be considered to be trimmed based on the application specifics, such as those resulting from the magnitude of the magnetic field varying with time (e.g., because of airgap or other variations) and giving rise to amplitude modulation. With this arrangement, magnetic field magnitude variations are taken into account when generating the harmonic error coefficients that are applied to the channel signals and this arrangement can yield more accurate channel signals and thus, ultimately more accurate error compensation and sensor output signals.

The controller 334 may normalize corrected signals 332a and 332b, after which the controller may use the normalized signals to determine the angular position of the rotating target 314 in accordance with equation 2 below:

$$\theta = a\tan\left(\frac{S_{332b}}{S_{332a}}\right) \qquad (2)$$

where $\theta$ is the angular position of the rotating target 314, $S_{332a}$ is the value of signal 332a, and $S_{332b}$ is the value of signal 332b. It will be appreciated by those of ordinary skill in the art that the computation of equation (2) can be performed by a CORDIC processor, or other suitable processing. After the angular position of the rotating target 314 is determined, the controller 34 may generate the output signal 340 based on the determined angular position.

The output interface 338 is responsive to the controller output signal 336 and may include any suitable type of interface for outputting the output signal 340. For example, the output interface 338 may include one or more of a current generator, an Inter-Integrated Circuit ($I^2C$) interface, a Controller Area Network (CAN bus) interface, a Single Edge Nibble Transmission (SENT) interface, Wi-Fi interface, a local-area network interface, a 5G wireless interface, and/or any other suitable type of interface.

While the sensor 312 of FIG. 3 is described as taking the form of an angle sensor that generates a sensor output signal 340 indicative of the angular position of the target 314, it will be appreciated by those of ordinary skill in the art that sensor 312 can alternatively take other forms, such as a speed sensor or current sensor as non-limiting examples. It will be further appreciated by those of ordinary skill in the art that while the sensor 312 is shown to include two channels 320a, 320b, more or fewer channels are possible. For example, channel 320b could be eliminated to yield a single channel sensor. In a single channel embodiment, it will be appreciated that a different mechanism for generating feedback angle signal 352 is required. By way of a non-limiting example, in the case of a single channel speed sensor, controller 334 can perform an angle computation based on detection of the target speed and the time between a plurality of threshold crossing switch points (e.g., points at which a channel signal 318a crosses a predetermined threshold) in order to determine target angular position. As another example, a third channel could be added and the sensing modules from the three channels (e.g., three secondary pickup coils of an inductive sensor) could be arranged to generate respective signals having a 120° phase shift with respect to each other from which the angle could be calculated.

Consideration of FIG. 3 reveals that the sensor 312 is configured to generate channel signals 318a, 318b, digitize the signals, adjust the gain of each channel to make them equal by operation of amplitude and offset adjust blocks 326a, 326b, and estimate the harmonic error terms by operation of the compensator 350 based on previously calculated angle and magnitude (i.e., as expressed by feedback angle and magnitude signals 352, 254) and stored sets of phase and magnitude coefficients for each harmonic. The estimated harmonic error terms are then subtracted from the channels by operation of summation elements 330a, 330b, and the angle and field magnitude are recalculated based on the corrected signals 332a, 332b by the controller 334.

The signals 318a, 318b generated by sensing modules 316a, 316b can be expressed as follows:

$$X = A_M A_X \left( \cos(\Phi) + \sum_{k=0}^{n} a_{X,k} \sin(k\Phi + \theta_{X,k}) \right) \quad (3)$$

$$Y = A_M A_Y \left( \sin(\Phi) + \sum_{k=0}^{n} a_{Y,k} \sin(k\Phi + \theta_{Y,k}) \right) \quad (4)$$

where n is the number of harmonics present in the observed distortion or the ones to be compensated.

Assuming that the gain of the amplitude adjustment blocks 326a, 326b are such that the channel gains are normalized, X' and Y' at the output of the amplitude and offset adjust blocks 326a, 326b can be written as follows:

$$X' = A_M \left( \cos(\Phi) + \sum_{k=0}^{n} a_{X,k} \sin(k\Phi + \theta_{X,k}) \right) \quad (5)$$

$$Y' = A_M \left( \sin(\Phi) + \sum_{k=0}^{n} a_{Y,k} \sin(k\Phi + \theta_{Y,k}) \right) \quad (6)$$

In operation, on each calculation update, or iteration i, compensator 350 utilizes the values of phase angle and magnitude ($\tilde{\phi}$ and $\widetilde{A_M}$) estimated on previous update (i-1) (as may take the form of feedback angle and magnitude signals 352, 354, respectively), along with stored harmonic error compensation coefficients $\alpha_{X,k}$, $\alpha_{Y,k}$, $\theta_{X,k}$, $\theta_{Y,k}$ that are stored in non-volatile memory, to generate estimations of the harmonic terms as may be represented by the following equations (7) and (8):

$$HD'_{X,i} = \tilde{A}_{M,i-1} \sum_{k=0}^{n} a_{X,k} \sin(k\tilde{\Phi}_{i-1} + \theta_{X,k}) \quad (7)$$

$$HD'_{Y,i} = \tilde{A}_{M,i-1} \sum_{k=0}^{n} a_{Y,k} \sin(k\tilde{\Phi}_{i-1} + \theta_{X,k}) \quad (8)$$

Given harmonic term amplitudes that are low enough for the loop to converge, after some number of iterations, the HD' terms match the HDx 228a, HDy 228b terms of FIG. 2, and the resulting corrected signals X" 332a and Y" 332b result in the desired, corrected signals that do not contain harmonic distortion as can be represented by equations (9) and (10):

$$X''= A_M \cos(\varphi) \quad (9)$$

$$Y''= A_M \sin(\varphi) \quad (10)$$

It will be appreciated that although the $A_M$ term remains in the corrected signals 332a, 332b as shown by equations (9) and (10), this term is constant and appears on both channel signals. Thus, the $A_M$ term cancels upon performing an angle calculation by computing the arctangent of (Y"/X") and the angle calculation will be error free.

Figure 4:
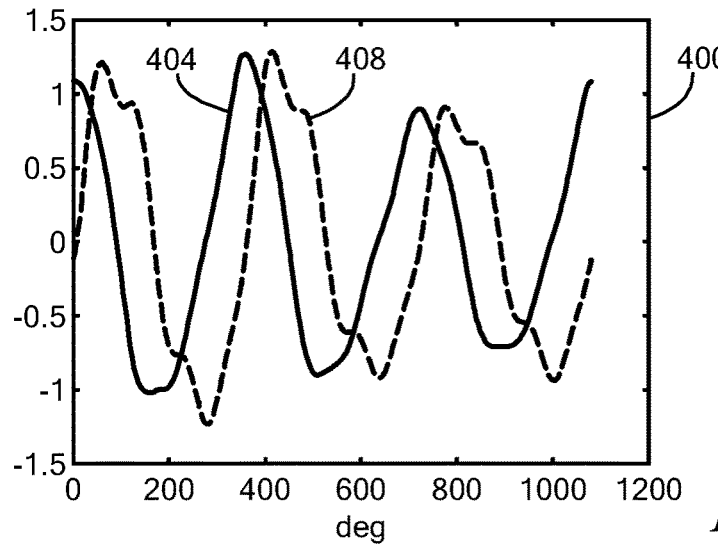
FIG. 4 shows example X-Y channel signals without harmonic compensation applied.

Referring now to FIG. 4, a plot 400 illustrates X and Y channel signals 404, 408 as may be generated by a magnetic field sensor that does not implement the described harmonic error compensation. The x-axis represents example target angular position in degrees and the y-axis represents normalized strength of the X and Y channel signals 404, 408 in arbitrary units. Consideration of signals 404, 408 illustrates harmonic error and amplitude modulation. FIGS. 4-4F are based on a simulation with four harmonic terms (i.e., the harmonic content of the fundamental electrical angle signal, second, third, and fourth harmonics) and an amplitude modulation of +/–20%.

Figure 4A:
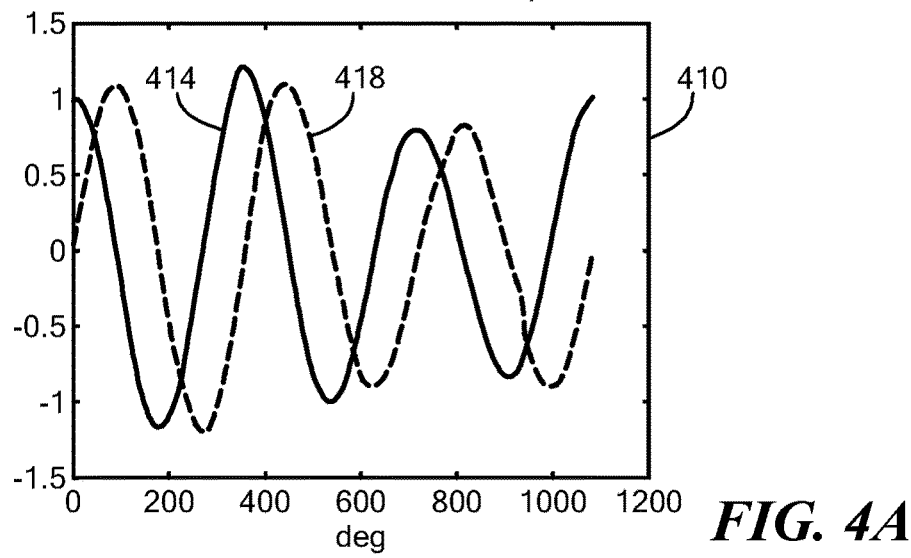
FIG. 4A shows example X-Y channel signals after applying the harmonic compensation associated with the sensor of FIG. 1.

Referring also to FIG. 4A, a plot 410 illustrates X and Y channel signals 414, 418 as may be generated by the magnetic field sensor 10 of FIG. 1 with which harmonic error compensation is applied based on an angle feedback signal (e.g., signal 33). The x-axis represents example target angular position in degrees and the y-axis represents normalized strength of the X and Y channel signals 414, 418 in arbitrary units. Consideration of signals 414, 418 illustrates removal of harmonic error, but remaining amplitude modulation, as compared to the plot 400 of FIG. 4.

Figure 4B:
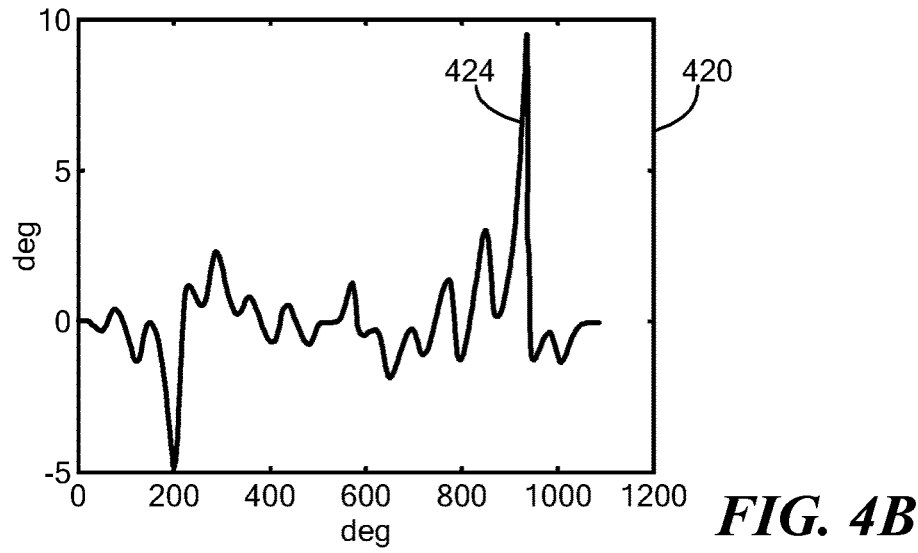
FIG. 4B shows angle error associated with the X-Y channel signals of FIG. 4A.

Referring to FIG. 4B, a plot 420 illustrates the error 424 in the angle detection by a sensor such as magnetic field sensor 10 of FIG. 1 with which harmonic error compensation is applied based on an angle feedback signal (e.g., signal 33). The x-axis represents example target angular position in degrees and the y-axis represents the magnitude of the error in the angle determination in units of degrees. Consideration of error 424 illustrates removal of harmonic error, but remaining amplitude modulation, as compared to the plot 400 of FIG. 4.

Figure 4C:
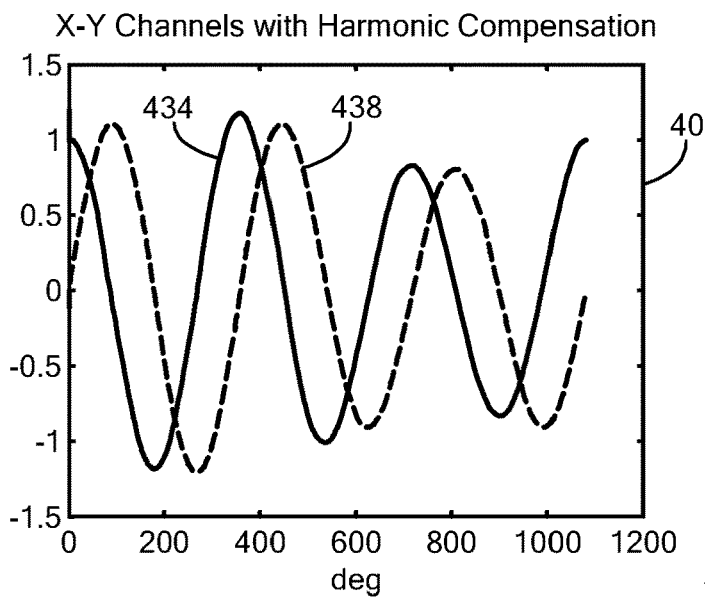
FIG. 4C shows example X-Y channel signals after applying the harmonic compensation with field magnitude correction associated with the sensor of FIG. 3.

Referring also to FIG. 4C, a plot 430 illustrates X and Y channel signals 434, 438 as may be generated by the magnetic field sensor 312 of FIG. 3 with which harmonic error compensation is applied based on an angle feedback signal (e.g., signal 352) and also based on field magnitude feedback signal (e.g., signal 354). The x-axis represents example target angular position in degrees and the y-axis represents normalized strength of the X and Y channel signals 434, 438 in arbitrary units. Consideration of signals 434, 438 illustrates removal of harmonic error scaled by amplitude modulation, as compared to the plot 400 of FIG. 4.

Figure 4D:
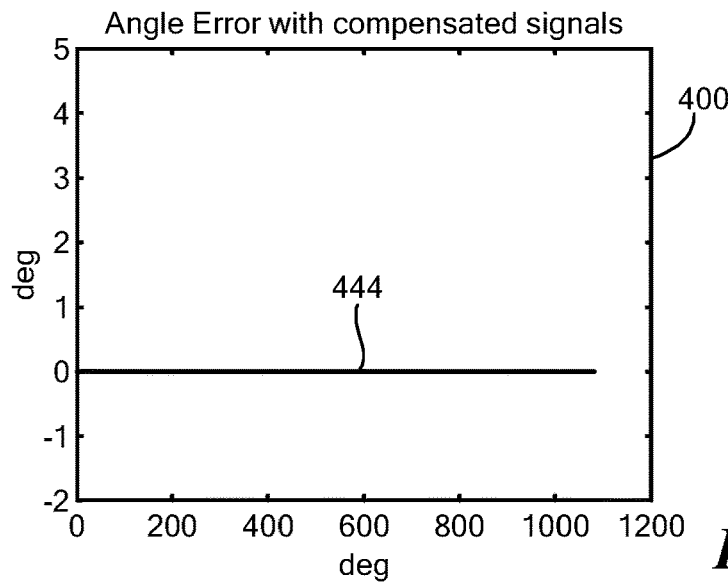
FIG. 4D shows angle error associated with the X-Y channel signals of FIG. 4C.

Referring to FIG. 4D, a plot 440 illustrates the error 444 in the angle detection by a sensor such as magnetic field sensor 312 of FIG. 3 with which harmonic error compensation is applied based on an angle feedback signal (e.g., signal 352) and also based on field magnitude feedback signal (e.g., signal 354). The x-axis represents example target angular position in degrees and the y-axis represents the magnitude of the error in the angle determination in units of degrees. Consideration of error 444 illustrates removal of harmonic error and amplitude modulation-related error, resulting in substantially entire error removal, as shown.

Figure 4E:
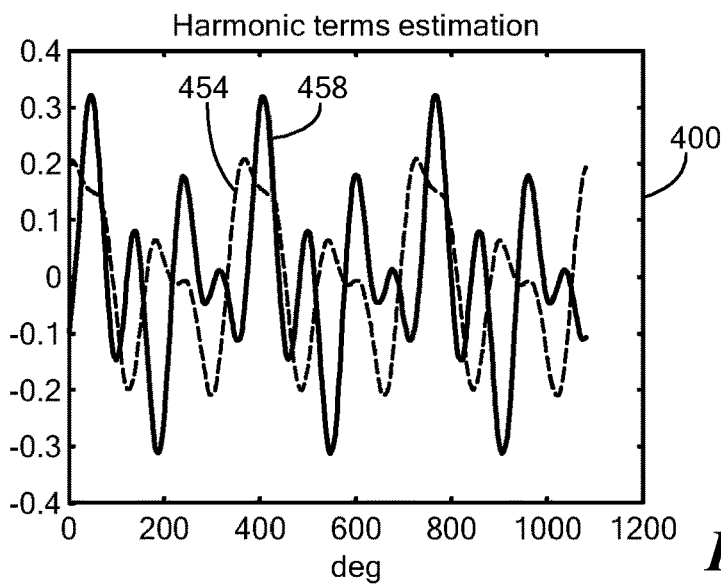
FIG. 4E illustrates harmonic terms estimated by the harmonic compensation with field magnitude correction associated with the sensor of FIG. 3.
Figure 4F:
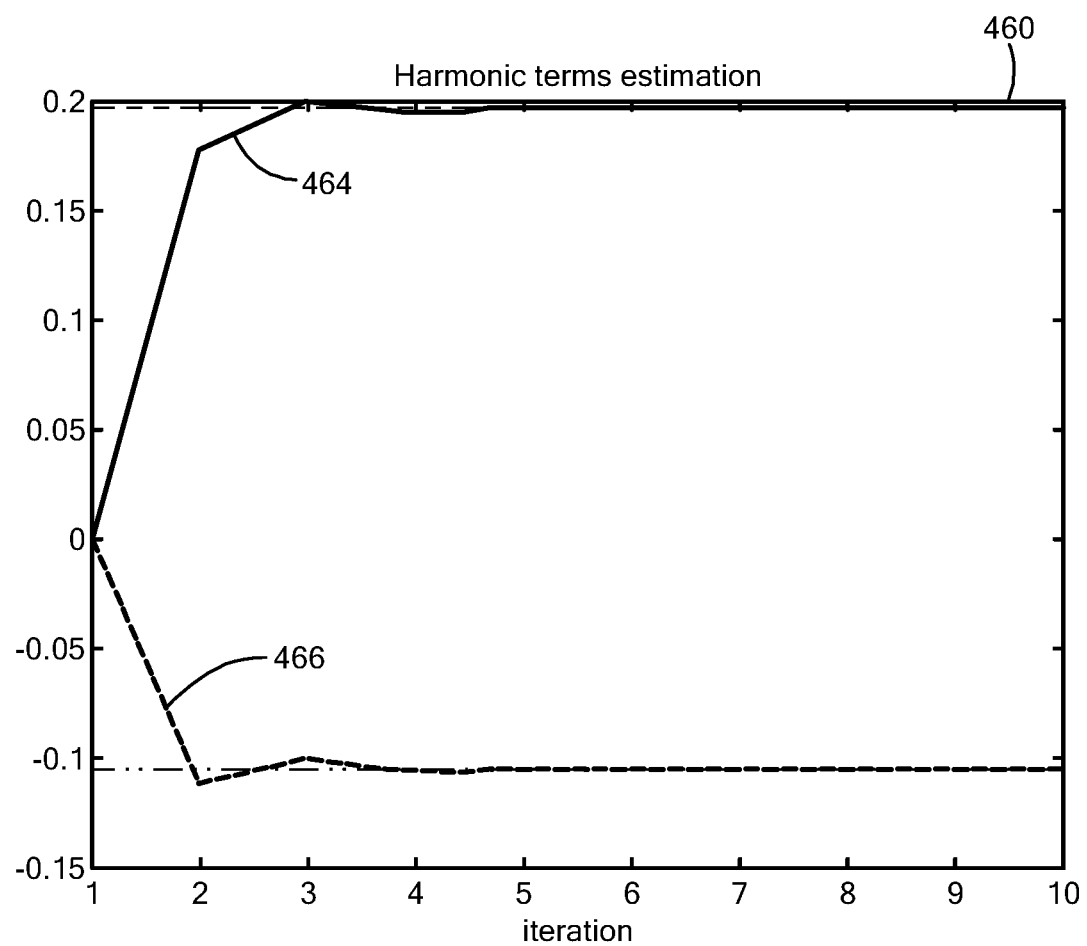
FIG. 4F shows the convergence of the harmonic terms estimated after a few processing iterations with the error terms sought to be compensated.

Referring to FIG. 4E, a plot 450 shows the harmonic error of a signal 454 (shown by a dotted line) as may represent a channel signal, such as signal 328a, 328b of FIG. 3 and also the estimate of the harmonic terms 458 (shown by as solid line), such as may be represented by HD'x 356, HD'y 358 of FIG. 3. The x-axis represents example target angular position in degrees and the y-axis represents the magnitude of the harmonic estimate terms in arbitrary units. Consideration of plot 450 reveals that the estimate of the harmonic terms 458 relatively closely matches the magnitude and angle of the channel signals 328a, 328b.

FIG. 4F is a plot 460 showing convergence of the harmonic terms estimate 466 and the harmonic error 464 after a few iterations. The x-axis the number of iterations of the controller 334 (FIG. 3) in computing the harmonic terms estimate and the y-axis represents the magnitude of the error in the angle determination in units of degrees. Consideration of plot 460 reveals that after about five or so iterations, the harmonic terms estimation 466 and 464 converges with the errors that are desired to be compensated.

Figure 5:
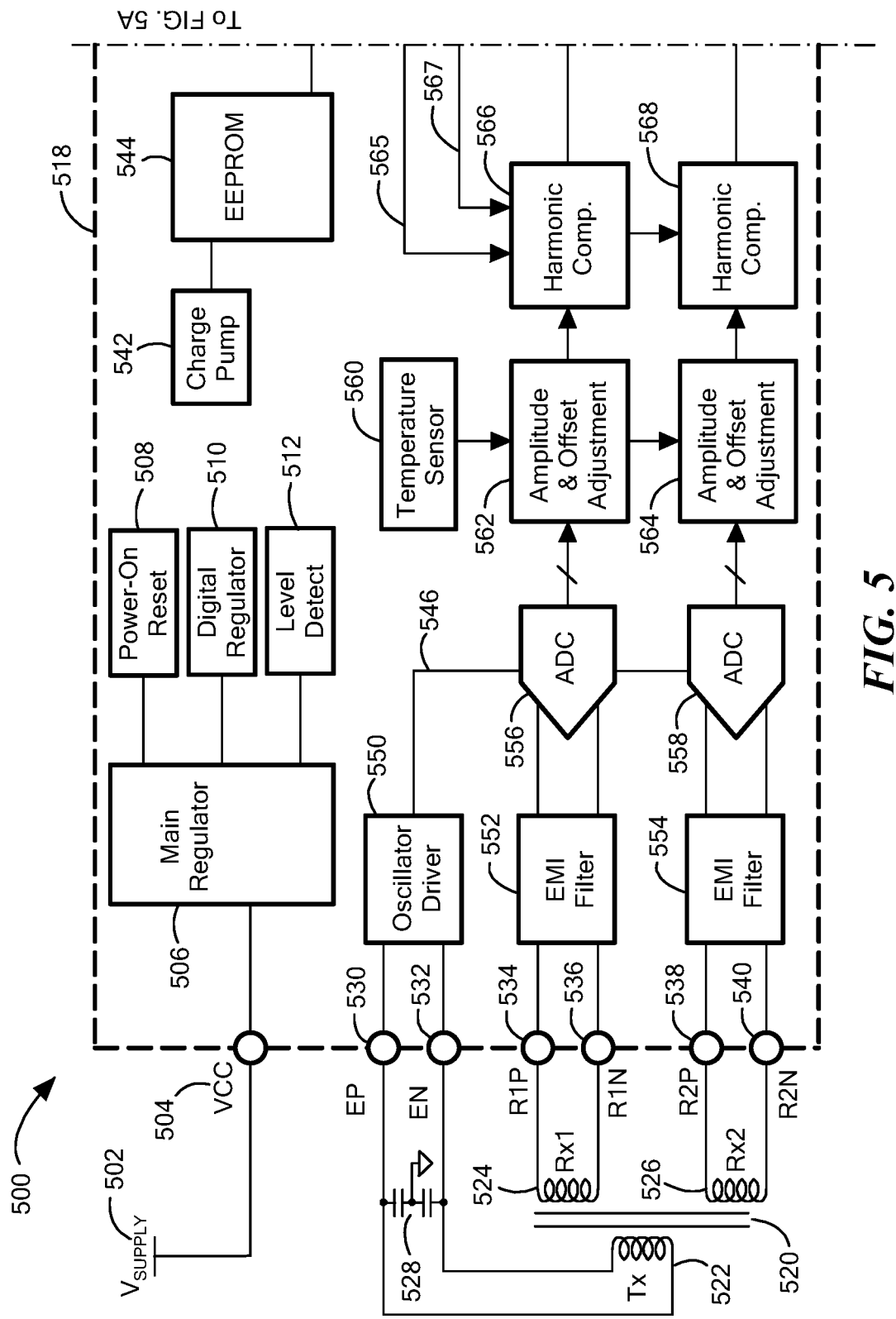
FIGS. 5 and 5A are a block diagram of an example magnetic field sensor implementing harmonic compensation with field magnitude feedback according to the disclosure.
Figure 5A:
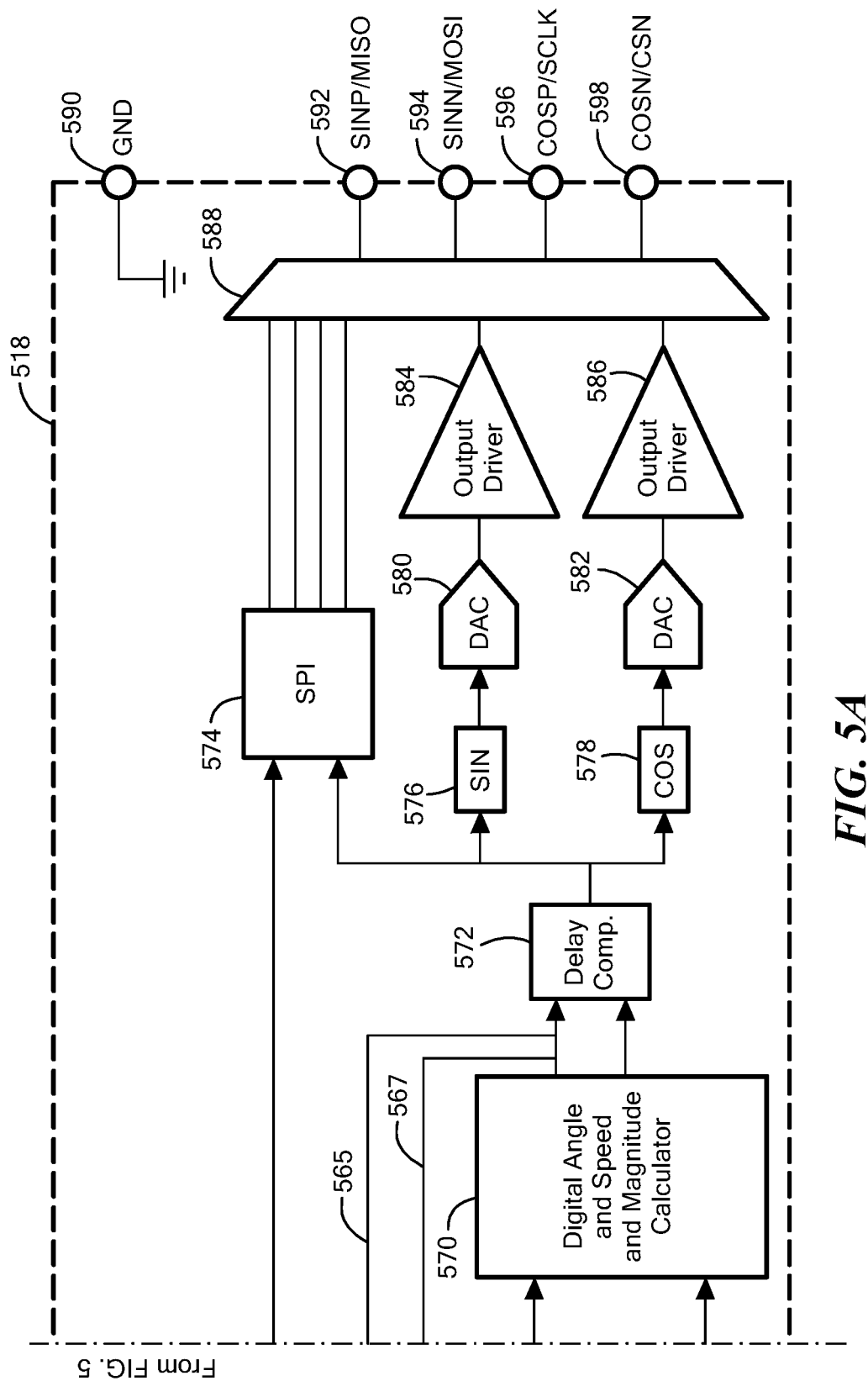

Referring also to FIGS. 5 and 5A, an inductive position sensor system 500 can be an implementation of the system 310 of FIG. 3. To this end, system 500 includes an oscillator, a primary coil 522, here two secondary coils 524, 526, and an interface circuit 518. Interface circuit 518 generates an oscillation signal for coupling to primary coil 522 through connections 530, 532 and is coupled to receive secondary signals from secondary coils 524, 526 through respective connections 534, 536, and 538, 540, as shown. Secondary coils 524, 526 are electromagnetically coupled to the primary coil 522 and mechanically coupled to a target 520 such that movement of the target causes position information to be encoded in the secondary signals from coils 524, 526 by amplitude modulation.

The oscillator 528 may take the form of the illustrated resonant circuit (e.g., an LC tank circuit including capacitors 528 and primary coil 522) or other oscillation circuits. The oscillation signal has a carrier frequency and a primary phase and the secondary signals have the carrier frequency and a respective secondary phase.

Secondary windings 524, 526 can be designed to have a predetermined phase relationship with respect to each other in order to suit a particular application. In the example embodiment, secondary windings 524, 526 are designed to generate respective secondary signals in quadrature (i.e., having a nominal ninety-degree phase shift with respect to each other). With this arrangement, the system 500 can generate quadrature sine and cosine output signals (at connections 592, 594 and 596, 598) that can be used to determine target speed, direction, and/or angle.

Interface 518 can include two signal paths (e.g., an analog, digital or mixed signal path) each coupled to receive a secondary signal from a secondary winding 524, 526. Each signal path can include an EMI filter 552, 554 and an analog-to-digital converter (ADC) 556, 558 as shown. ADCs 556, 558 can be the same as or similar to sampling and conversion circuit 30 (FIG. 1) and thus, can be configured to sample the respective secondary signal (e.g., by integration over sample periods) and convert the integrated signal into a digital signal in order to generate a digital signal 546 that can be the same as or similar to digital signal 32 (FIG. 1).

Oscillator driver 550 contains a demodulator and phase error compensation control loop elements. Thus, oscillator driver 550 is configured to detect an alignment of the secondary phase with respect to the primary phase (based on observation of the demodulated signal) and apply a delay to the ADCs 556, 558 if the secondary phase is not aligned with the sample periods (i.e., the output of the delay circuit 40 is not aligned with the secondary phase). In this way, oscillator driver 550 operates to align the demodulation phase by setting up the sample windows to account for any phase shift between the secondary signals and the oscillation signal. Thus, demodulation is performed synchronously with respect to the detected phase of the secondary signals (thus taking into account any phase shift) rather than with respect to the primary oscillation in order to accurately recover target position information.

The signal paths may further include various signal conditioning and compensation of possible errors due to coils-target alignments and system design. For example, amplitude and offset adjustment may be provided by circuits 562, 564. In general, signal amplitudes will be affected by the current flowing through the primary coil 522 and the distance between the coil and the target. Temperature may also affect signal amplitudes and offsets. Thus, amplitude and offset adjustment circuits 562, 564 can be coupled to receive temperature information from a temperature sensor 560 and can operate to automatically track and compensate signal amplitudes and offsets.

Harmonic compensators 566, 568 can be the same as or similar to compensator 350 and elements 330a, 330b of FIG. 3 and can perform harmonic error compensation on channel signals using error coefficients stored in EEPROM 544 during manufacture in order to thereby remove undesirable harmonics that could adversely affect position sensing. To this end, compensators 566, 568 can be coupled to receive feedback signals 565, 567 from a processor 570 that can be the same as or similar to controller 334 of FIG. 3. Based on the fed back angle and field magnitude, compensators 566, 568 can estimate harmonic error and apply the error estimate to the channel signals to generate corrected channel signals for coupling to the processor 570.

Processor 570 is coupled to receive the conditioned channel signals and is configured to calculate an angle and magnetic field magnitude to generate feedback signals 565, 567. Processor 570 may additionally be configured to calculate speed of motion (e.g., rotation) of the target 520. For example, target angle and magnetic field magnitude can be computed using a CORDIC method as described above. Target speed can be computed as the derivative of target angle. For example, using consecutive angle values in time, speed is proportional to (angle_1–angle_0)/delta_time]. A delay compensator 572 can reduce the effective path latency of the interface 518. For example, the calculated speed can be used to correct the angle signal provided at the output of compensator 572 for the delays in signal path.

Sine and cosine elements 576, 578 can reconstruct sine and cosine differential signals that can be provided as interface output signals. The sine and cosine signals thus generated can be converted to analog signals by respective digital-to-analog converters (DACs) 580, 582. Output drivers 584, 586 can be coupled to receive the analog sine and cosine signals, as shown.

The interface output signals can be provided in one or more of various formats at one or more connections 592, 594, 596, 598 for coupling to external elements and systems (not shown). In the example interface 518, the output signals are provided in a selected one of a quadrature differential analog signals (SIN P, SIN N at connections 592, 594 and COS P, COS N at connections 596, 598) or an angle position signal provided in a Serial Peripheral Interface (SPI) format. SPI processor 574 controls a multiplexer 588 in order to provide interface output signals according to the SPI format or as differential sine and cosine output signals. The selection of interface output signal type can be based on user-programmable parameters stored in EEPROM 544. It will be appreciated that other output signal information such as speed and direction and other output signal formats are possible, including but not limited to Pulse Width Modulation (PWM) format, Single Edge Nibble Transmission (SENT) format, Local Interconnect Network (LIN) format, CAN (Controller Area Network) format, and/or an Inter-Integrated Circuit (I²C) format to name a few.

Interface 518 can be provided in the form of an integrated circuit (IC) including one or more semiconductor die and can receive power $V_{SUPPLY}$ 502 at a connection 504 for coupling to an on-chip regulator 506 and can have a ground connection 590. A digital regulator 510 can generate a regulated voltage for powering digital circuitry of the interface and a power-on reset circuit 508 and a level detect circuit 512 can be provided. A charge pump 582 can be coupled to a memory device, such as an EEPROM 580 for storing operating values and parameters, such as output signal format, gain and offset correction coefficients, and harmonic correction parameters as examples.

While the interface 518 may be provided in the illustrated form of an IC with an analog front end portion and a digital portion, it will be appreciated that the particular delineation of which circuit functions are implemented in an analog fashion or with digital circuitry and signals can be varied. Further, some of the illustrated circuit functions can be implemented on an interface IC and other circuitry and functionality can be implemented on separate circuits (e.g., additional substrates within the same integrated circuit package, or additional integrated circuit packages, and/or on circuit boards).

Figure 6:
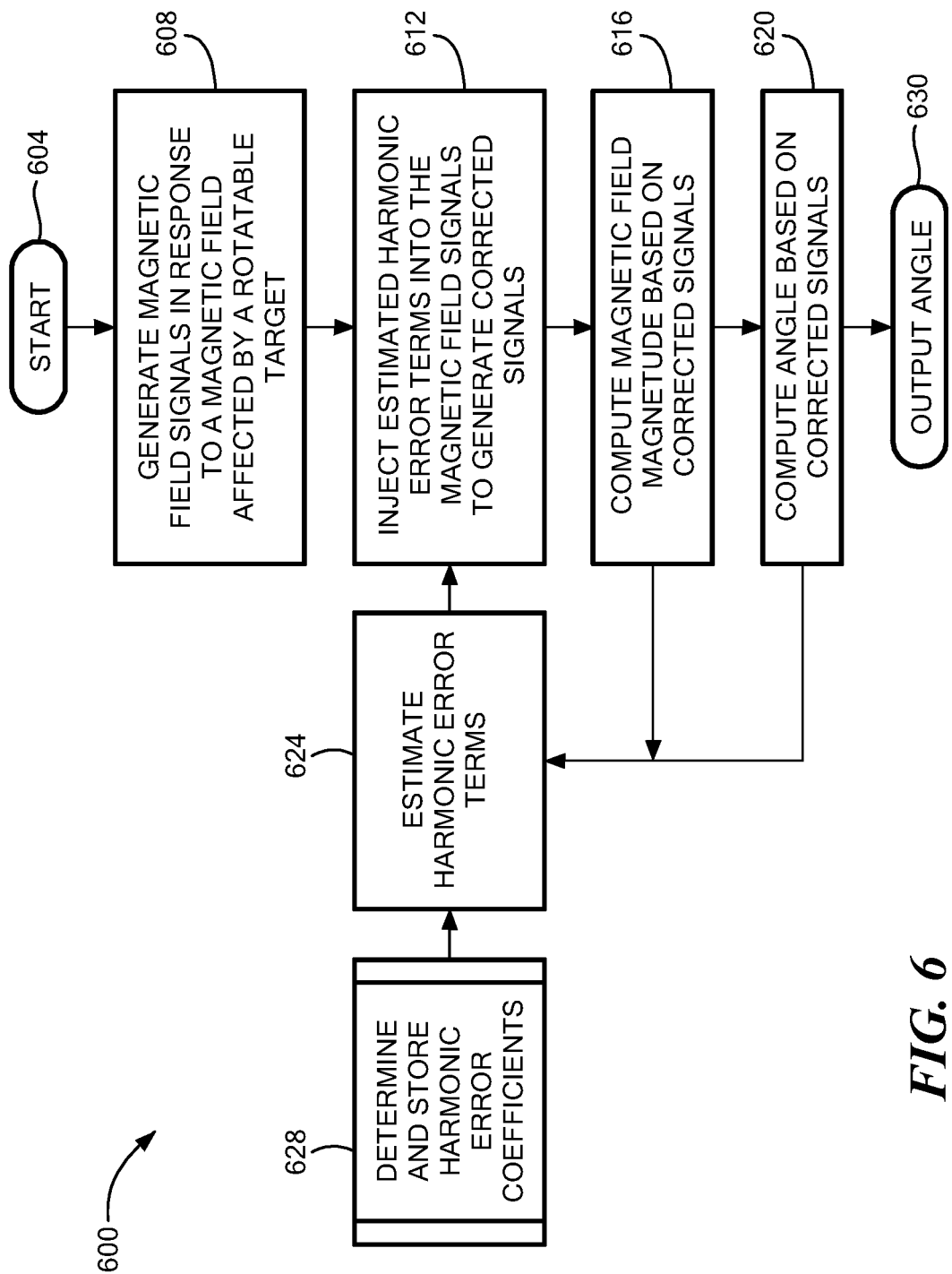
FIG. 6 is a flow diagram illustrating a method of correcting harmonic error of a magnetic field signal according to the disclosure.

Referring also to FIG. 6, a flow diagram illustrates an example method 600 of correcting harmonic error in a magnetic field signal according to the disclosure. The process commences at block 604, following which one or more magnetic field signals are generated in response to a magnetic field affected by a rotating target. For example, block 604 can correspond to any one or more of channel signals 318a, 318b, 324a, 324b, 328a, 328b being generated in response to a magnetic field affected by rotation of target 314.

At block 608, estimated harmonic error terms are applied to the generated magnetic field signals. For example, block 608 can correspond to operation of summation elements 330a, 330b of FIG. 3 in applying estimated harmonic error terms HD'x 356, HD'y 358 to channel signals 328a, 328b, respectively. The result of applying the Estimated harmonic error terms HD'x 356, HD'y 358 are respective corrected signals 332a, 332b.

The magnetic field magnitude can be computed at block 616 based on the corrected signals 332a, 332b and at block 620, the target angle can be computed. As noted above, both the field magnitude and the angular position can be computed by CORDIC processing. The resulting angle signal and field magnitude can be fed back to the compensator. For example, as shown in FIG. 3, feedback signals 352, 354 can be coupled to compensator 350.

At block 624, the harmonic error is estimated for subsequent injection to the channel signals. For example, compensator 350 (FIG. 3) can estimate the error terms HD'x 356, HD'y 358 by using the values of angle and magnitude ($\hat{\phi}$ and $\widetilde{A_M}$) estimated on previous update (i-1) (as may take the form of feedback angle and magnitude signals 352, 354, respectively), along with stored harmonic error compensation coefficients $\alpha_{X,k}$, $\alpha_{Y,k}$, $\theta_{X,k}$, $\theta_{Y,k}$ that are stored in non-volatile memory, to generate estimations of the harmonic terms as may be represented by equations (7) and (8) above.

Process block 628 represents determining and storing harmonic error coefficients for use by the compensator 350 at block 624. For example, as described above, in a manufacturing setting, compensation coefficients can be determined, for example by collecting sensor output data during a single rotation of the target 314, performing a Fast Fourier Transform (FFT) on the collected data, and storing the results.

At block 630, the sensor output signal can be provided. For example, output interface 338 can provide sensor output signal 340 to indicate the angular position of the target 314 at block 630.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed is:

1. A method for correcting a harmonic error in a first signal and a second signal indicative of a parameter associated with a target in response a magnetic field affected by rotation of the target, comprising:
   generating the first signal that is indicative of the magnetic field;
   generating the second signal that is indicative of the magnetic field;
   calculating a magnitude of the magnetic field;
   estimating the harmonic error of the first signal and the second signal based on the magnitude of the magnetic field;
   applying the estimate of the harmonic error of the first signal to the first signal to generate a first corrected signal;
   applying the estimate of the harmonic error of the second signal to the second signal to generate a second corrected signal; and
   using the first corrected signal and the second corrected signal to provide a compensated output of a magnetic field sensor,
   wherein the parameter associated with the target is an angular position of the target.

2. The method of claim 1, wherein estimating the harmonic error of the first signal and the second signal comprises generating a plurality of coefficients, each corresponding to a phase angle of the rotatable target and a magnitude of the magnetic field.

3. The method of claim 1, further comprising:
   calculating the angular position of the target; and
   generating the estimate of the harmonic error of the first signal and the second signal based on both the calculated angular position and the magnitude of the magnetic field.

4. The method of claim 1, further comprising calculating the angular position of the target.

5. The method of claim 4, wherein estimating the harmonic error of the first signal and the second signal is further based on the angular position of the target.

6. The method of claim 4, wherein calculating the magnitude of the magnetic field comprises using a CORDIC processor.

7. A magnetic field sensor configured to sense an angular position of a rotatable target that affects a magnetic field, comprising:
   at least one first magnetic field sensing element that is arranged to generate a first signal that is indicative of the magnetic field;

at least one second magnetic field sensing element that is arranged to generate a second signal that is indicative of the magnetic field;
an angle calculator responsive to the first signal and to the second signal to generate an angle signal indicative of the angular position of the rotatable target;
a magnitude calculator responsive to the signal and configured to generate a magnitude signal indicative of a magnitude of the magnetic field;
a harmonic compensator responsive to the angle signal and to the magnitude signal and configured to:
generate an estimate of a harmonic error of the first signal and apply the estimate of the harmonic error of the first signal to the first signal to generate a first corrected signal; and
generate an estimate of a harmonic error of the second signal and apply the estimate of the harmonic error of the second signal to the second signal to generate a second corrected signal,
wherein the first corrected signal and the second corrected signal are used to provide a compensated output of the magnetic field sensor.

8. The magnetic field sensor of claim 7, wherein the rotatable target comprises a primary coil coupled to receive an oscillation signal,
wherein the at least one first magnetic field sensing element comprises a first secondary coil electromagnetically coupled to the primary coil and configured to generate the first signal, and
wherein the at least one second magnetic field sensing element comprises a secondary coil electromagnetically coupled to the primary coil and configured to generate the second signal.

9. The magnetic field sensor of claim 7, wherein the estimate of the harmonic error of the first signal and the estimate of the harmonic error of the second signal each comprise a plurality of coefficients corresponding to a phase angle of the rotatable target and a magnitude of the magnetic field.

10. The magnetic field sensor of claim 7, wherein the rotatable target has a plurality of magnetic poles and wherein the harmonic error of the first signal and the harmonic error of the second signal are based at least in part on one or more of variations in the first signal or the second signal attributable to the plurality of magnetic poles, mounting of the magnetic field sensor with respect to the rotatable target, and manufacturing tolerances associated with the rotatable target, the at least one first magnetic field sensing element, and/or the at least one second magnetic field sensing element.

11. A magnetic field sensor configured to sense a parameter associated with a target that affects a magnetic field, comprising:
at least one magnetic field sensing element that is arranged to generate a signal that is indicative of the magnetic field;
a magnitude calculator responsive to the signal and configured to generate a magnitude signal indicative of a magnitude of the magnetic field; and
a harmonic compensator responsive to the magnitude signal and configured to generate an estimate of a harmonic error of the signal and apply the estimate of the harmonic error of the signal to the signal to generate a corrected signal,
wherein the parameter associated with the rotatable target is an angular position of the rotatable target,
wherein the at least one magnetic field sensing element comprises at least one first magnetic field sensing element arranged to generate a first signal that is indicative of the parameter associated with the target and at least one second magnetic field sensing element arranged to generate a second signal that is indicative of the parameter associated with the target,
wherein the harmonic compensator is configured to generate an estimate of a harmonic error of the first signal and the second signal and apply the estimate of the harmonic error of the first signal to the first signal to generate a first corrected signal and apply the estimate of the harmonic error of the second signal to the second signal to generate a second corrected signal, and
wherein the first corrected signal and the second corrected signal are used to provide a compensated output of the magnetic field sensor.

12. The magnetic field sensor of claim 11, wherein the estimate of the harmonic error of the signal comprises a plurality of coefficients, each corresponding to a phase angle of the rotatable target and a magnitude of the magnetic field.

13. The magnetic field sensor of claim 11, wherein the rotatable target has a plurality of magnetic poles and wherein the harmonic error is based at least in part on one or more of variations in the signal attributable to the plurality of magnetic poles, mounting of the magnetic field sensor with respect to the rotatable target, and manufacturing tolerances associated with the rotatable target and/or the at least one magnetic field sensing element.

14. The magnetic field sensor of claim 11, wherein the first and second signals are in quadrature.

15. The magnetic field sensor of claim 11, further comprising an angle calculator configured to generate an angle signal indicative of the angular position of the rotatable target based on the first signal and the second signal,
wherein the harmonic compensator is further responsive to the angle signal and configured to generate the estimate of a harmonic error of the first signal and the second signal.

16. The magnetic field sensor of claim 15, wherein the magnitude calculator and the angle calculator comprise a CORDIC processor.

17. The magnetic field sensor of claim 15, wherein the angle calculator comprises an angle tracking observer having a sine block and a cosine block and wherein the magnitude calculator is configured to use the sine block and the cosine block to generate the magnitude signal.

18. The magnetic field sensor of claim 11, wherein the rotatable target comprises a primary coil coupled to receive an oscillation signal,
wherein the at least one first magnetic field sensing element comprises a first secondary coil electromagnetically coupled to the primary coil and configured to generate the first signal, and
wherein the at least one second magnetic field sensing element comprises a secondary coil electromagnetically coupled to the primary coil and configured to generate the second signal.

19. The magnetic field sensor of claim 11, further comprising:
a first summation element coupled to receive the estimate of a harmonic error of the first signal and apply the estimate of a harmonic error of the first signal to the first signal; and
a second summation element coupled to receive the estimate of a harmonic error of the second signal and apply the estimate of a harmonic error of the second signal to the second signal.

* * * * *

UNITED STATES PATENT AND TRADEMARK OFFICE
CERTIFICATE OF CORRECTION

PATENT NO. : 11,555,716 B1  
APPLICATION NO. : 17/505707  
DATED : January 17, 2023  
INVENTOR(S) : Nicolás Rigoni et al.

Page 1 of 2

It is certified that error appears in the above-identified patent and that said Letters Patent is hereby corrected as shown below:

In the Specification

Column 3, Line 39 delete "response a" and replace with --response to a--.

Column 5, Line 58 delete "18a)" and replace with --16a)--.

Column 7, Line 14 delete "including" and replace with --include--.

Column 10, Line 34 delete "18a" and replace with --316a--.

Column 10, Line 38 delete "target 14" and replace with --target 314--.

Column 10, Line 49 delete "one more" and replace with --one or more--.

Column 11, Line 45 delete "including" and replace with --include--.

Column 11, Line 60 delete "HD'x 356" and replace with --HD'x, 356--.

Column 11, Line 63 delete "HD'y 358" and replace with --HD'y, 358--.

Column 11, Line 66 delete "HD'x 356, HD'y 358" and replace with --HD'x, 356, HD'y, 358--.

Column 13, Line 3 delete "...+β)–" and replace with --...+β*)---.

Column 13, Line 38 delete "HD'x 356, HD'y 358" and replace with --HD'x, 356, HD'y, 358--.

Column 14, Line 27 delete "34" and replace with --334--.

Column 16, Line 63 delete "HD'x 356, HD'y 358" and replace with --HD'x, 356, HD'y, 358--.

Signed and Sealed this  
Fifth Day of December, 2023

Katherine Kelly Vidal  
*Director of the United States Patent and Trademark Office*

CERTIFICATE OF CORRECTION (continued)
U.S. Pat. No. 11,555,716 B1

Column 17, Line 5 delete "x-axis the" and replace with --x-axis represents the--.

Column 17, Line 14 delete "310" and replace with --300--.

Column 18, Line 38 delete "_time]" and replace with --_time)--.

Column 18, Line 55 delete "(SIN P, SIN N" and replace with --(SINP, SINN--.

Column 18, Line 56 delete "COS P, COS N" and replace with --COSP, COSN--.

Column 19, Line 10 delete "582" and replace with --542--.

Column 19, Line 11 delete "580" and replace with --544--.

Column 19, Line 40 delete "HD'x 356, HD'y 358" and replace with --HD'x, 356, HD'y, 358--.

Column 19, Line 41 delete "Estimated" and replace with --estimated--.

Column 19, Line 42 delete "HD'x 356, HD'y 358" and replace with --HD'x, 356, HD'y, 358--.

Column 19, Lines 54-55 delete "HD'x 356, HD'y 358" and replace with --HD'x, 356, HD'y, 358--.

In the Claims

Column 20, Line 22 delete "response a" and replace with --response to a--.

Column 21, Line 53 delete "a target" and replace with --a rotatable target--.